United States Patent
Banas et al.

[11] Patent Number: 5,836,680
[45] Date of Patent: Nov. 17, 1998

[54] EXTRUDER WITH FEEDBACK LOOP CONTROL

[75] Inventors: Mark Daniel Banas, Cuyahoga Falls; Gary Robert Burg, Canton; Malcolm George Marshall, Wadsworth; Thomas Alan Murray, Akron; Bruce Joseph Turner, Wadsworth, all of Ohio

[73] Assignee: The Goodyear Tire & Rubber Company, Akron, Ohio

[21] Appl. No.: 622,662

[22] Filed: Mar. 26, 1996

[51] Int. Cl.$^6$ .................................................. B29C 47/00
[52] U.S. Cl. ................................ 366/80; 366/90; 425/209
[58] Field of Search .................................. 360/79, 80, 90, 360/96, 97, 98, 99; 425/207, 208, 209

[56] References Cited

U.S. PATENT DOCUMENTS

| | | | |
|---|---|---|---|
| 4,178,104 | 12/1979 | Menges et al. | 366/80 |
| 4,462,691 | 7/1984 | Boguslawski | 366/83 |
| 4,735,565 | 4/1988 | Capelle | 366/80 |
| 4,900,155 | 2/1990 | Schwarz et al. | 366/76 |
| 4,906,102 | 3/1990 | Schwarz et al. | 366/76 |
| 5,141,426 | 8/1992 | Capelle | 425/203 |
| 5,147,198 | 9/1992 | Capelle | 366/80 |
| 5,158,725 | 10/1992 | Handa et al. | 264/40 |
| 5,190,771 | 3/1993 | Baumgarten | 366/80 |
| 5,215,374 | 6/1993 | Meyer | 366/90 |
| 5,332,309 | 7/1994 | Ramazzotti | 366/88 |
| 5,362,146 | 11/1994 | Nogossek | 366/82 |

*Primary Examiner*—Tony G. Soohoo
*Attorney, Agent, or Firm*—Frederick K Lacher

[57] ABSTRACT

An extruder for extruding an associated material includes an extruder housing that has a feed section, a center section that includes a throttle section, and an outlet section with an extruder screw disposed in the extruder housing. The extruder also includes a throttle at the throttle section. The throttle has a plurality of pins that extend radially into the housing. The pins are adjusted by a cam extending around the extruder housing. The cam has an inner wall that has a plurality of cam surfaces engageable by pins. The radius of each of the cam surfaces gradually decreases from a maximum radius to a minimum radius distance. The pins have springs that urge the pins radially outward to contact the inner wall of the cam. The cam is rotated by a piston and cylinder assembly. The extruder further includes sensors for temperature, gauge, weight, and other properties of the material. The extruder also has a control apparatus for controlling the speed of the extruder and the throttle based upon any combination of temperature, gauge, weight, and production requirements while the extruder is in operation.

11 Claims, 2 Drawing Sheets

5,836,680

EXTRUDER WITH FEEDBACK LOOP CONTROL

BACKGROUND OF THE INVENTION

1. Field of Invention

This invention pertains to the art of methods and apparatuses for extruding materials, such as rubber, and more specifically to methods and apparatuses for extruding materials at a substantially constant temperature, gauge, or weight at variable rates of extruder operation.

2. Description of the Related Art

In the past extruders have had adjustable throttles to provide desired temperature during extruder operation. These extruders and throttles, however, could not be adjusted dynamically while the extruder was in operation. Additionally, changes in extruder speed and the throttle could affect the output of the extruder, although past extruders could not compensate for these changes without stopping the production run of the extruder to make throttle and extruder speed adjustments.

Applicants recognized the need to make changes in extruder speed and throttle position while the extruder was in operation, and to make these changes automatically and subject to variables such as material temperature, gauge, weight, and other material properties.

The present invention contemplates a new and improved extruder which is simple in design, effective in use, and overcomes the foregoing difficulties and others while providing better and more advantageous overall results.

SUMMARY OF THE INVENTION

In accordance with the present invention, a new and improved extruder is provided which maintains a substantially constant temperature, gauge, and weight in the extruded material under variable operating conditions.

More particularly, in accordance with the present invention, the extruder for extruding an associated material includes an extruder housing that has a feed section, a center section that includes a throttle section, and an outlet section. The extruder also includes an extruder screw disposed in the extruder housing that has a core portion and a helical portion, the helical portion being helical about a longitudinal axis. The extruder further includes a throttle that surrounds a portion of the throttle section. The throttle has a plurality of pins extending radially into the housing about the longitudinal axis of the extruder screw. The pins are radially adjustable by a cam that extends around the extruder housing. The cam has a center, an inner wall, and an outer wall, the inner wall has a plurality of sections corresponding to the pins, each of the sections has a radial distance from the center of the cam to the inner wall. The radial distance of each of the sections gradually decreases from a maximum radial distance to a minimum radial distance. The pins have springs that urge the pins radially outward to contact the inner wall of the cam. The cam urges the pins into the throttle section when the cam is rotated in a first direction such that the pins are in contact with the inner wall at a smaller radial distance than before the cam is rotated to reduce the cross-sectional area of the throttle section. The pins are movable radially outward from the throttle section by the springs when the cam is rotated in an opposite direction such that the pins are in contact with the inner wall at a greater radial distance than before the cam is rotated to increase the cross-sectional area of the throttle section. The extruder also includes a cam rotation apparatus that rotates the cam.

According to one aspect of the invention, the method of extruding an associated material using an extruder includes the steps of feeding the associated material into the feed section of the extruder housing and rotating the extruder screw to masticate the associated material and to move the associated material through the extruder. The method further includes the steps of measuring the temperature of the associated material at the outlet section of the extruder housing using a temperature sensing apparatus and measuring gauge and weight of the associated material at the outlet section of the extruder housing using a measuring apparatus. The method finally includes the step of adjusting the throttle in response to changes in the extruded associated material to compensate for changes in temperature, gauge, and weight of the associated material at the outlet section of the extruder housing as determined by the temperature sensing apparatus and the measuring apparatus.

One advantage of the present invention is that the extruder may measure the temperature of a raw material, such as rubber, as it leaves the extruder using a temperature sensor.

Another advantage of the present invention is that the extruder may measure the gauge of the material, such as rubber, that is processed by the extruder using a measuring device such as a laser.

Another advantage of the present invention is that the extruder may measure the weight of the material, such as rubber, that is processed by the extruder using a measuring device such as a scale.

Another advantage of the present invention is that the extruder throttle may be dynamically adjusted without stopping the extruder.

Another advantage of the present invention is that the extruder control device controls extruder screw speed and throttle.

Another advantage of the present invention is that the extruder control device controls extruder screw speed and throttle while taking into account any combination of material temperature, gauge, weight, and production requirements.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
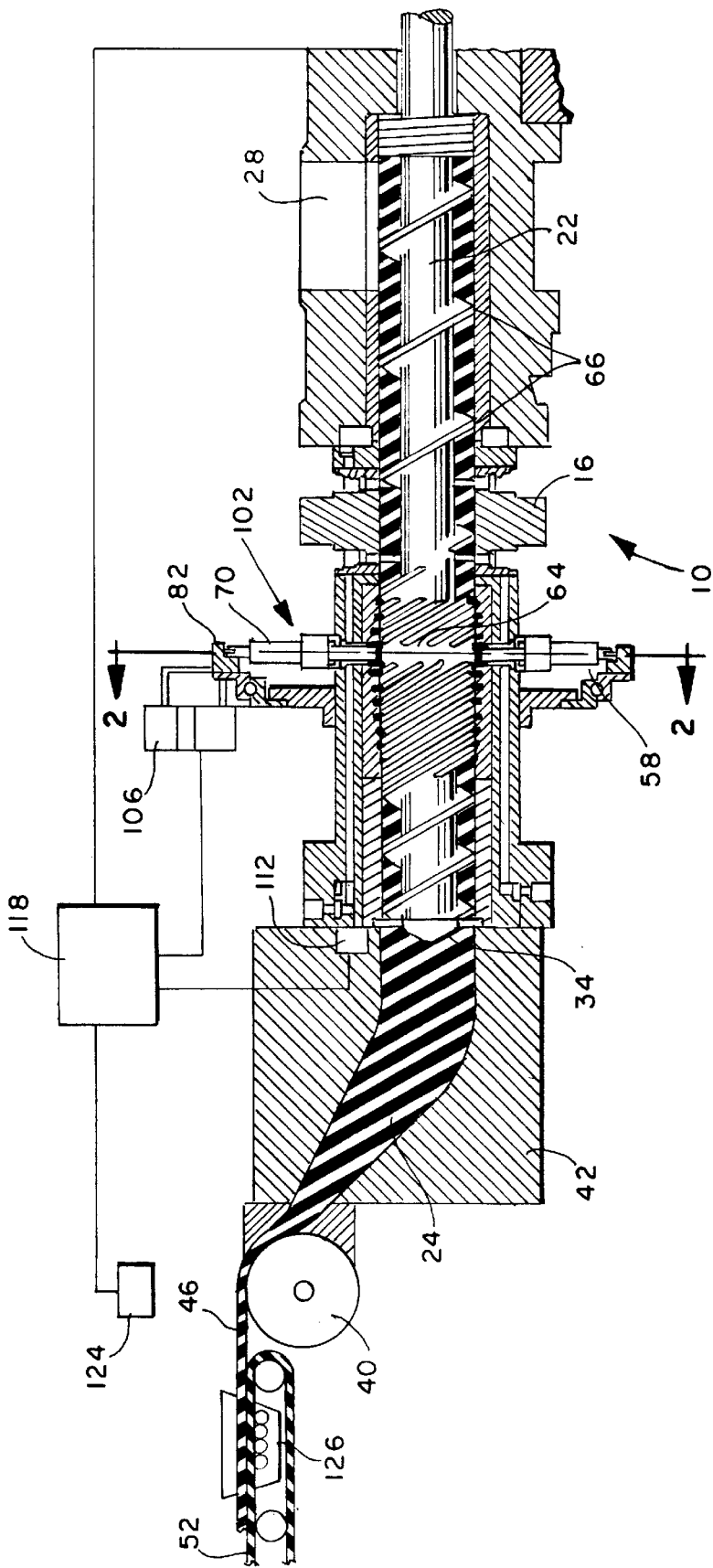
FIG. 1 is a schematic side cross sectional elevation of an extruder and auxiliary equipment embodying the invention.

Referring now to the drawings wherein the showings are for purposes of illustrating a preferred embodiment of the invention only and not for purposes of limiting the same, FIG. 1 shows a side view of an extruder 10 having an outer housing 16 and a screw 22. Material such as rubber 24 is fed into the extruder 10 through a feed opening 28 at the rear of the extruder 10. The rubber 24 is then masticated and processed by the screw 22 as the screw passes the rubber through the extruder 10. The rubber 24 is then ejected from the extruder 10 at an outlet opening 34. In the preferred embodiment of the invention, the rubber 24 is applied to a roller 40 through a roller die 42 to form a product 46 which is carried away on a conveyor belt 52.

In the event that production of the product 46 must be decreased due to constraints, such as decreased demand ahead of the conveyor belt 52, the speed of rotation of the screw 22 may be decreased. Some materials, however, will cool below an optimum temperature as the screw 22 slows down the mastication and extrusion process. This is particularly a problem for materials such as rubber. To maintain the temperature of the rubber 24 in the extruder 10, a throttle 58 is utilized. The throttle 58 is preferably located around the center of the extruder 10. The screw 22 preferably has a cylindrical region 64 where the throttle 58 is located to prevent damage to flights 66 of the screw 22. The throttle includes a number of pins 70 that can be disposed in the space within the housing 16 of the extruder 10. The pins 70 offer resistance to the rubber 24 being forced by the screw 22 through the extruder 10. The increased resistance offered to the rubber 24 heats the rubber 24, allowing the extruder 10 to run at a slower speed yet maintain a substantially constant temperature.

Figure 2:
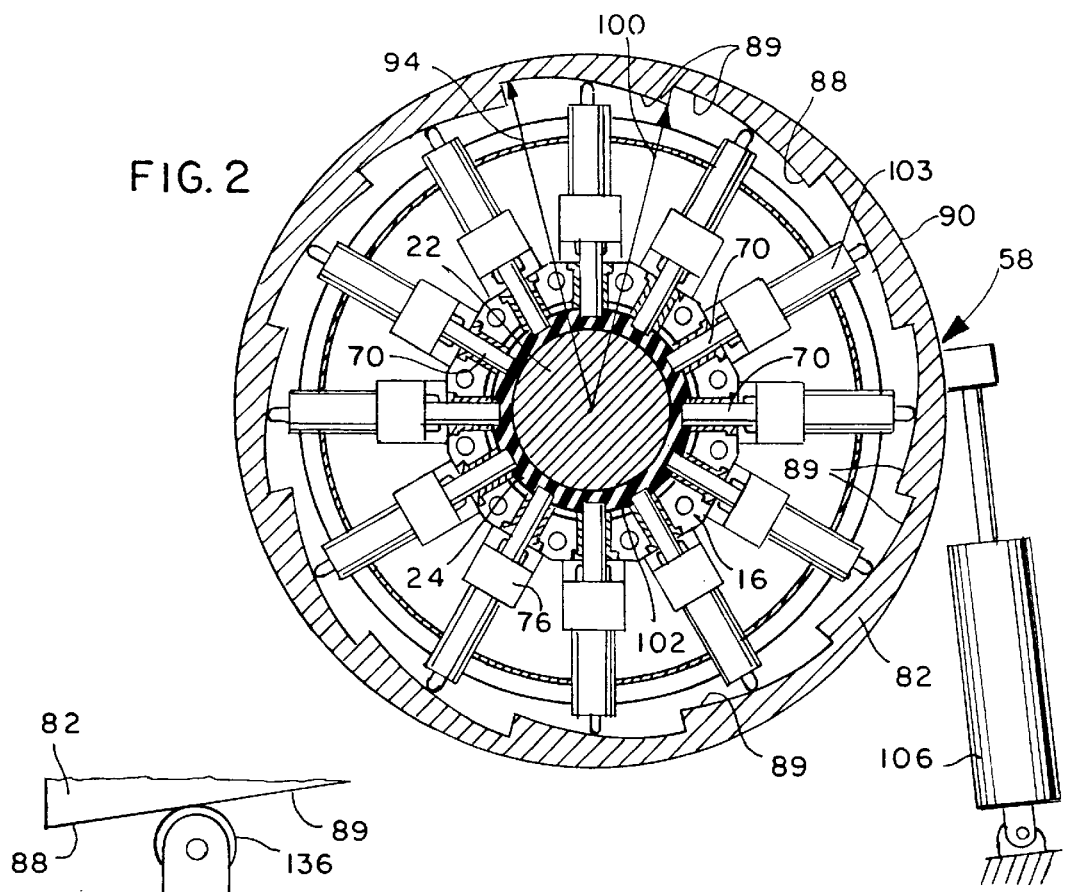
FIG. 2 is a cross-sectional view of the extruder throttle taken along line 2—2 of FIG. 1; and, FIG. 3 is a cross-sectional view of an extruder throttle pin.

FIG. 2 shows a cross section of the throttle 58 and the extruder 10 along line 2—2 of FIG. 1. The pins 70 are located at circumferentially spaced apart positions about the screw 22. The pins 70 are urged away from the screw 22 by resilient means, such as springs 76. While springs 76 are presently preferred, resilient means may also include a hydraulic or pneumatic system, or a rotation type of mechanism. The pins 70 are surrounded by a cam 82 that holds the pins 70 in place. The cam 82 is generally circular in shape, and has an inner wall 88 with cam surfaces 89. An outer wall 90 of any suitable shape may be provided. The inner wall 88 has a number of cam surfaces 89 that preferably corresponds to the number of pins 70. Each of the cam surfaces 89 of the inner wall 88 slopes from a maximum radius 94 to a minimum radius 100. Because the pins 70 contact the cam surfaces 89 of the inner wall 88, the contact position along the slope of the cam surfaces 89 of the inner wall 88 determines the position of the pins 70 within the extruder 10. For instance, when the pins 70 contact the cam surfaces 89 of the inner wall 88 at the maximum radius 94, the pins are moved radially outward by the springs 76. When the cam 82 is rotated so that the pins 70 contact the cam surfaces 89 of the inner wall 88 at the minimum radius 100, the pins 70 are moved into the barrel 102 of the extruder 10. The distance the pins 70 extend into the barrel 102 of the extruder 10 determines the resistance offered to the rubber 24 as it is moved through the extruder 10 by the flights 66 of the screw 22. The increased resistance increases the temperature of the rubber 24. If the rubber 24 has a temperature that is above the optimum temperature, the cam 82 is rotated so that the pins 70 contact the inner wall 88 at a position closer to or at the maximum radius 94, thus retracting the pins from the extruder 10 and decreasing the amount of resistance offered to the rubber, which in turn lowers the temperature of the rubber. The embodiment of the extruder 10 shown in FIG. 2 has 12 pins, and the inner wall 88 of the cam 82 has 12 cam surfaces 89. However, any suitable number of pins 70 and cam surfaces 89 may be employed. For instance, six pins 70 and six cam surfaces 89 have proven to be satisfactory.

Figure 3:
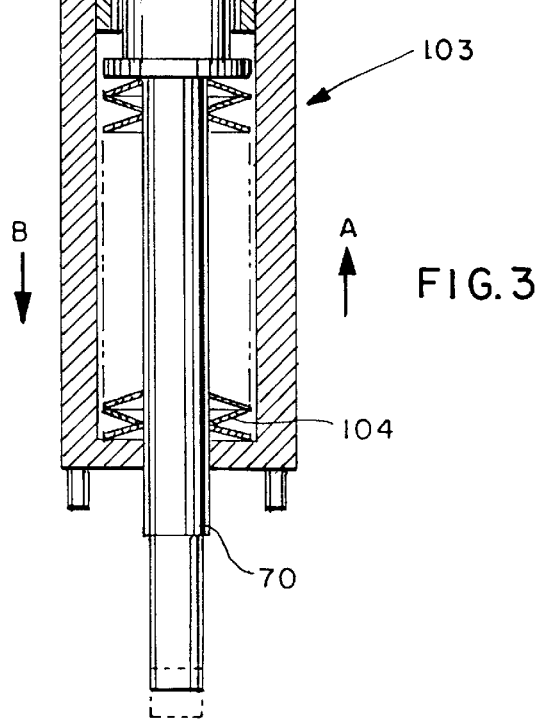

FIG. 3 shows a more detailed view of a pin assembly 103 for one of the pins 70. Each of the pins 70 is supported by one of the springs 76 that urges the pins radially outward in the direction of arrow A. The springs 76 are preferably a plurality of bellville springs. Each of the cam surfaces 89 of the inner wall 88 urges one of the pins 70 radially inward in the direction of arrow B. As the cam 82 is rotated, the cam surfaces 89 of the inner wall 88 are sloped, and thus change the position of the pins 70. If the cam 82 rotates so that the radii of the cam surfaces 89 increase, the pins 70 move in the direction of arrow A. If the cam 82 rotates so that the radii of the cam surfaces 89 decrease, the pins 70 move in the direction of arrow B. Each of the pins 70 may have a pin roller 136 at the point of contact with one of the cam surfaces 89 of the inner wall 88, which enables the cam 82 to rotate freely without damaging the pins 70.

With further reference to FIG. 1, the cam 82 is preferably rotated by a piston and cylinder assembly 106, though any suitable method or fashion may be employed to rotate the cam 82. The piston and cylinder assembly 106 preferably rotates the cam 82. The extruder 10 does not have to be stopped for rotation of the outer wall 90 of throttle 58.

The temperature of the rubber 24 may be detected by a temperature sensor 112 located at the outlet opening 34 of the extruder 10. In accordance with the extrusion properties of the material, a computer 118 may be programmed to provide the extruded material with the desired weight, size, and other properties after being extruded at a desired temperature. The temperature sensor 112 is connected to suitable controls, such as the computer 118, which further control the piston and cylinder assembly 106 and the speed at which the screw 22 rotates. When the computer 118 determines, based on data from the temperature sensor 112, that the rubber 24 is at a temperature below the optimum level, the computer 118 activates the piston and cylinder assembly 106 to rotate the cam 82 so that the pins 70 are moved radially inward into the extruder 10. The computer 118 may also slow the speed of rotation of the screw 22 of the extruder 10. The computer 118 may then increase resistance of the throttle 58 to maintain optimum temperature in the rubber 24.

The computer 118 is preferably connected to a gauge measurement apparatus 124 and a weight measurement apparatus, such as weigh scale 126. The gauge measurement apparatus 124 preferably includes a laser to make fine measurements of the gauge, or size, of the product 46 as it leaves the extruder 10 on the conveyor belt 52. The weigh scale 126 makes fine measurements of weight of the product 46. The position of the throttle 58 may affect the output of the extruder 10, and require an appropriate adjustment in the rotation rate of the screw 22 to maintain the specified gauge and weight of the finished product 46. The computer 118 may also be used to interpret all data concerning temperature, gauge, weight, and other properties of the rubber 24 and product 46. The computer 118 controls the rotation rate of the screw 22 and position of the throttle 58. The computer 118 is preferred because the relationships between temperature, gauge, weight and other properties of the rubber 24 and finished product 46, the position of the throttle 58, and the rotation rate of the screw 22 are non-linear.

It is understood that another type of throttle 58 to control the passage of the rubber 24 through the extruder 10 may be used.

The preferred embodiments have been described, hereinabove. It will be apparent to those skilled in the art that the above apparatus and methods may incorporate changes and modifications without departing from the general scope of this invention. It is intended to include all such modifications and alterations in so far as they come within the scope of the appended claims or the equivalents thereof.

Having thus described the invention, it is now claimed:

1. An extruder for extruding an associated material comprising:

an extruder housing having a feed section, a center section including a throttle section, and an outlet section;

an extruder screw rotatably mounted in said extruder housing, said extruder screw having a core portion and a helical portion with said helical portion being helical about a longitudinal axis;

a throttle surrounding a portion of said throttle section, said throttle having a plurality of pins extending radially into said housing about said longitudinal axis of said extruder screw, said pins being radially adjustable by a circular cam extending around said extruder housing, said cam having a center, an inner wall, and an outer wall, said inner wall having a plurality of cam surfaces for engagement by said pins, each of said cam surfaces having a radius from said center, said radius gradually decreasing from a maximum radius to a minimum radius, said pins having resilient means for urging said pins radially outward to contact said cam surfaces, said cam surfaces urging said pins radially inward into said throttle section when said cam is rotated in a first direction such that said pins are in contact with said cam surfaces at a smaller radius than before said cam is rotated to reduce the cross-sectional area of said throttle section, and said pins being movable radially outward from said throttle section by said resilient means when said cam is rotated in an opposite direction such that said pins are in contact with said cam surfaces at a greater radius than before said cam is rotated to increase the cross-sectional area of said throttle section; and, cam rotation means for rotating said cam.

2. The extruder of claim 1 wherein said cam rotation means comprises a piston and cylinder assembly, said piston and cylinder assembly being connected to said cam to rotate said cam in said first direction and in said opposite direction.

3. The extruder of claim 2 further comprising temperature sensing means for sensing the temperature of said associated material at said outlet section of said extruder housing and said cam rotation means being responsive to a change in temperature determined by said temperature sensing means.

4. The extruder of claim 3 further comprising control means for controlling said extruder and said throttle, said control means being connected to said piston and cylinder assembly and said temperature sensing means, and said control means activating said piston and cylinder assembly to move said throttle in response to a change in temperature as sensed by said temperature sensing means.

5. The extruder of claim 4 further comprising measuring means for measuring gauge of said associated material extruded from said outlet section of said extruder housing, said measuring means being connected to said control means, said control means activating said throttle in response to changes in the gauge of said associated material as detected by said measuring means.

6. The extruder of claim 4 further comprising weighing means for measuring weight of said associated material extruded from said outlet section of said extruder housing, said weighing means being connected to said control means, said control means activating said throttle in response to changes in the weight of said associated material as detected by said weighing means.

7. The extruder of claim 4 wherein said control means is connected to means for rotating said extruder screw, thereby controlling the speed at which said extruder screw rotates.

8. The extruder of claim 2 wherein said piston and cylinder assembly is operable to rotate said cam during operation of said extruder.

9. The extruder of claim 1 wherein said throttle comprises six pins and said cam comprises six cam surfaces engageable by said six pins.

10. An extruder for extruding an associated material comprising:

an extruder housing, said extruder housing having a feed section, a center section including a throttle section, and an outlet section;

an extruder screw disposed in said extruder housing, said extruder screw having a core portion and a helical portion, said helical portion being helical about a longitudinal axis;

a throttle surrounding a portion of said throttle section, said throttle having a plurality of pins extending radially into said housing about said longitudinal axis of said extruder screw, said pins being radially adjustable by a cam extending around said extruder housing, said cam having a center, an inner wall, and an outer wall, said inner wall having a plurality of cam surfaces corresponding to said pins, each of said cam surfaces having a radius, said radius of each of said cam surfaces gradually decreasing from a maximum radius to a minimum radius, said pins having resilient means for urging said pins radially outward to contact said cam surfaces of said cam, said cam urging said pins into said throttle section when said cam is rotated in a first direction such that said pins are in contact with said cam surfaces at a smaller radius than before said cam is rotated to reduce the cross-sectional area of said throttle section, and said pins being movable radially outward from said throttle section by said resilient means when said cam is rotated in an opposite direction such that said pins are in contact with said cam surfaces at a greater radius than before said cam is rotated to increase the cross-sectional area of said throttle section;

a piston and cylinder assembly, said piston and cylinder assembly being connected to said cam to rotate said cam in said first direction and said opposite direction, said piston and cylinder assembly being operable to rotate said cam during operation of said extruder;

temperature sensing means for sensing the temperature of said associated material at said outlet section of said extruder housing, said piston and cylinder assembly being responsive to change in temperature determined by said temperature sensing means;

control means for controlling said extruder and said throttle, said control means being connected to said piston and cylinder assembly and said temperature sensing means, said control means activating said piston and cylinder assembly to move said throttle when said temperature sensing means senses a change in temperature, said control means being connected to said extruder screw, thereby controlling the speed at which said extruder screw rotates;

measuring means for measuring gauge, weight, and other properties of said associated material, said measuring means being connected to said control means, said control means activating said throttle when changes in the gauge, weight, and other properties of said associated material are detected.

11. The extruder of claim 10 wherein said throttle comprises six pins and said cam comprises six cam surfaces for contacting said six pins.

* * * * *